United States Patent
McKinley et al.

(10) Patent No.: US 6,327,597 B1
(45) Date of Patent: Dec. 4, 2001

(54) METHOD, MEMORY SYSTEM, AND COMPUTER PROGRAM PRODUCT FOR IMPLEMENTING LOCK BASED DELAYED SPACE RECYCLE CONTROL

(75) Inventors: Thomas Owen McKinley, Rochester; Gary Ross Ricard, Chatfield; Richard Miles Rocheleau, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,765

(22) Filed: Aug. 6, 1999

(51) Int. Cl.⁷ .................................................... G06F 17/30
(52) U.S. Cl. ............................................. 707/206; 707/10
(58) Field of Search .................................. 707/200, 201, 707/202, 203, 204, 205, 206; 711/147, 152, 165, 173

(56) References Cited

U.S. PATENT DOCUMENTS 5,452,445 * 9/1995 Hallmark et al. .......................... 707/1
6,012,060 * 1/2000 Loaiza et al. ............................ 707/10
6,144,970 * 11/2000 Bonner et al. ......................... 707/206

OTHER PUBLICATIONS (IEEE publication) Parallel implementation of the trie structure by I.W. Chan et al., Dept. of Information Systems of Computer Systems, National University of Singapore, Singapore,, pp. 538–543 (Dec. 1994).*

(IEEE publication) Data compression in brain–like multimedia data bases by Charles Alfred Finnlla, Hughes Aircraft Company, Los Angeles, CA, pp. 158–163 (1993).*

* cited by examiner

*Primary Examiner*—Diane D. Mizrahi
(74) *Attorney, Agent, or Firm*—Joan Pennington

(57) ABSTRACT

A method, memory system, and computer program product are provided for implementing lock based delayed space recycle control. The memory space recycle method is used with a memory in a computer system. A data element lock is obtained for a data record in a data block. Then an update on the data record is performed. A waiting to be recycled index for the data block is maintained. The waiting to be recycled index includes a record number, an address of the large object block (LOB) and the length of the LOB space. When the last lock on a data element is about to be released the waiting to be recycled areas associated with that data element are freed.

9 Claims, 6 Drawing Sheets

| DATA MANAGER 134 | SHARED LARGE OBJECT DATA 136 | WAITING TO BE RECYCLED INDEX 138 |
|---|---|---|
| LOCK BASED DELAYED SPACE RECYCLE PROGRAM 132 | | |
| OPERATING SYSTEM 130 | | |

FIG. 1B

DATA TABLE 142

| RECORDS 144 | LOB POINTERS 146 |
|---|---|
| RECORD 0 | L1 |
| RECORD 1 | L2 |
| RECORD N | |

FIG. 1C

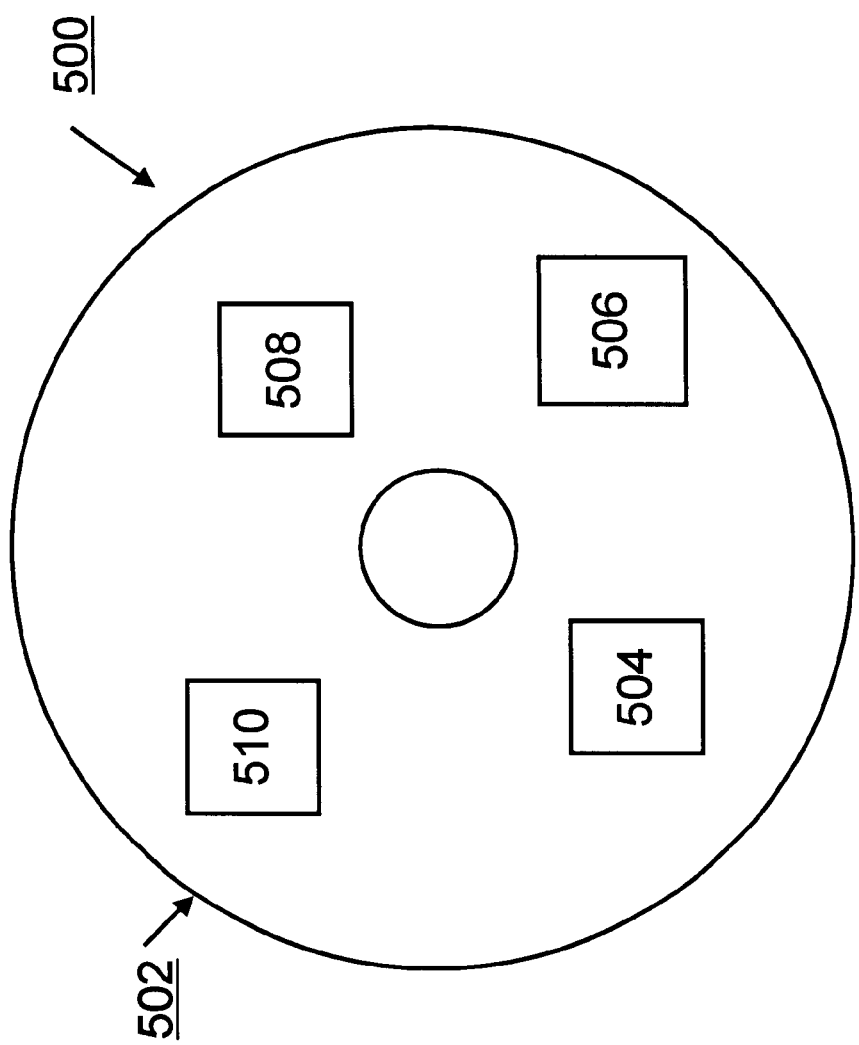

METHOD, MEMORY SYSTEM, AND COMPUTER PROGRAM PRODUCT FOR IMPLEMENTING LOCK BASED DELAYED SPACE RECYCLE CONTROL

FIELD OF THE INVENTION

The present invention relates to the data processing field, and more particularly to a method, memory system, and computer program product for implementing lock based delayed space recycle control.

DESCRIPTION OF THE RELATED ART

Relational database management systems (RDBMS) based on the Structured Query Language (SQL) are known. The basic unit of data in a relational database is the relation. DB2/400 is the DBMS that is integrated into the operating system of the International Business Machines Corp. Application System/400 (AS/400) computer system.

Normally when data is fetched from a structured query language (SQL) table, the user program is getting a copy of the data. Because the data for a large object (LOB) data type, such as a character large object block (CLOB) or double byte character large object (DBCLOB), can be very large, a copy of the field should not be made. Instead a mechanism must be provided to let the user access parts of the large piece of data directly in the database file.

Conventional methods for sharing LOB data must make a copy of the piece of the LOB data and then return addressability to the copy. Updates must be made to a new area inside the table to avoid affecting those existing copies. Also a shadowed page technique might be used. Both of these techniques require code to free the shadow or copy when the last locator is freed. Multiple locators to the same page require that each locator have its own copy, which causes slow performance and takes more memory. Or some kind of system wide use count for a copy or shadow is required.

A need exists for a more efficient and effective method, memory system, and computer program product for determining when to do recycle (or do garbage collection of space) implementing lock based delayed space recycle control.

SUMMARY OF THE INVENTION

A principal object of the present invention is to provide a method, memory system, and computer program product for determining when to do recycle (or do garbage collection of space) implementing lock based delayed space recycle control. Other important objects of the present invention are to provide such method, memory system, and computer program product for implementing lock based delayed space recycle control substantially without negative effects and that overcome many disadvantages of prior art arrangements.

In brief, a method, memory system, and computer program product are provided for implementing lock based delayed space recycle control. The memory space recycle method is used with a memory in a computer system. A data element lock is obtained for a data record in a data block. Then an update on the data record is performed. A waiting to be recycled index for the data block is maintained.

In accordance with features of the invention, the waiting to be recycled index includes a record number, an address of the large object block (LOB) and the length of the LOB space. When the last lock or a LOB data element is released the lock storage is freed.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a block diagram representation illustrating an operating system of the computer system of FIG. 1A;

FIG. 1C is a block diagram representation illustrating a data table structure of the preferred embodiment;

FIG. 5 is a block diagram illustrating a computer program product in accordance with the preferred embodiment.

DETAILED DESCRIPTION OF THE PREFERRED EMBODIMENTS

Figure 1A:
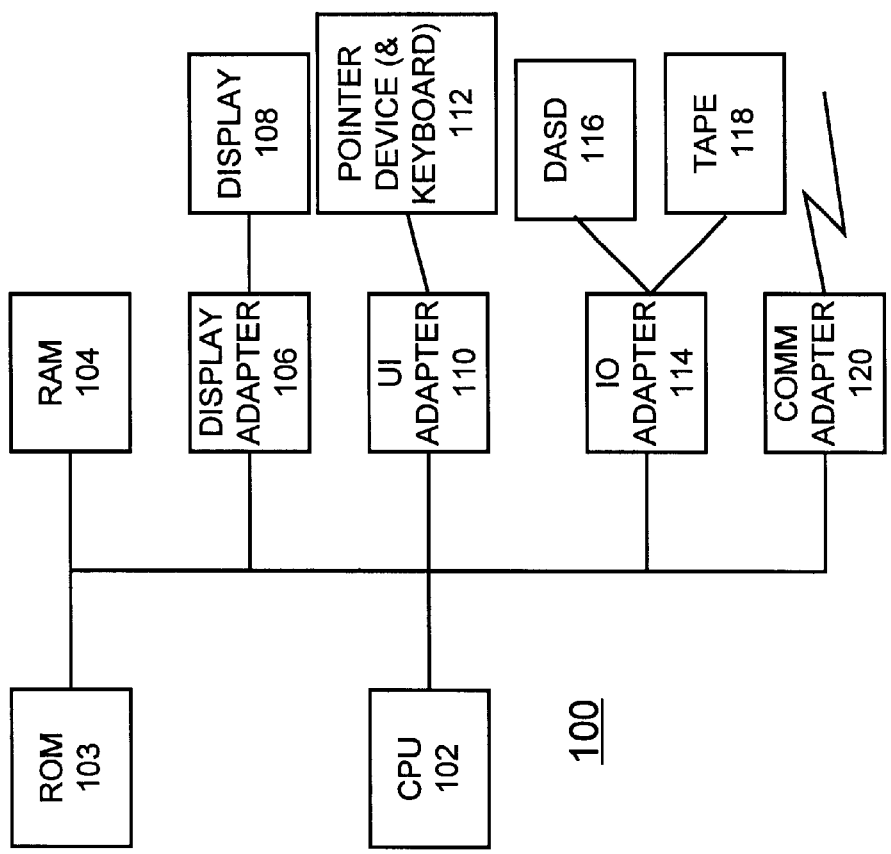
FIG. 1A is a block diagram representation illustrating a computer system for implementing lock based delayed space recycle control in accordance with the preferred embodiment.

Having reference now to the drawings, in FIG. 1A, there is shown a computer or data processing system generally designated by the reference character 100 for implementing a lock based delayed space recycle control methods in accordance with the preferred embodiment. As shown in FIG. 1A, computer system 100 includes a central processor unit (CPU) 102, a read only memory 103, a static random access memory or cache 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function.

Referring also to FIGS. 1B and 1C, computer system 100 includes an operating system 130, a lock based delayed space recycle program 132 of the preferred embodiment optionally used together with a data manager or controller 134, and a shared large object data 136. A recycle index 138 of the preferred embodiment is maintained for implementing lock based delayed space recycle methods in accordance with the preferred embodiment.

FIG. 1C illustrates a data table or data structure 142 including multiple records (0-N) 144 and multiple large object block (LOB) data pointers 146. A mechanism to let the user access parts of the large piece of data is called a large object locator (LOL). To provide persistent view of data through a LOB locator, the LOB locator must not update in place when there are active locators for a particular row in the table.

Figure 2:
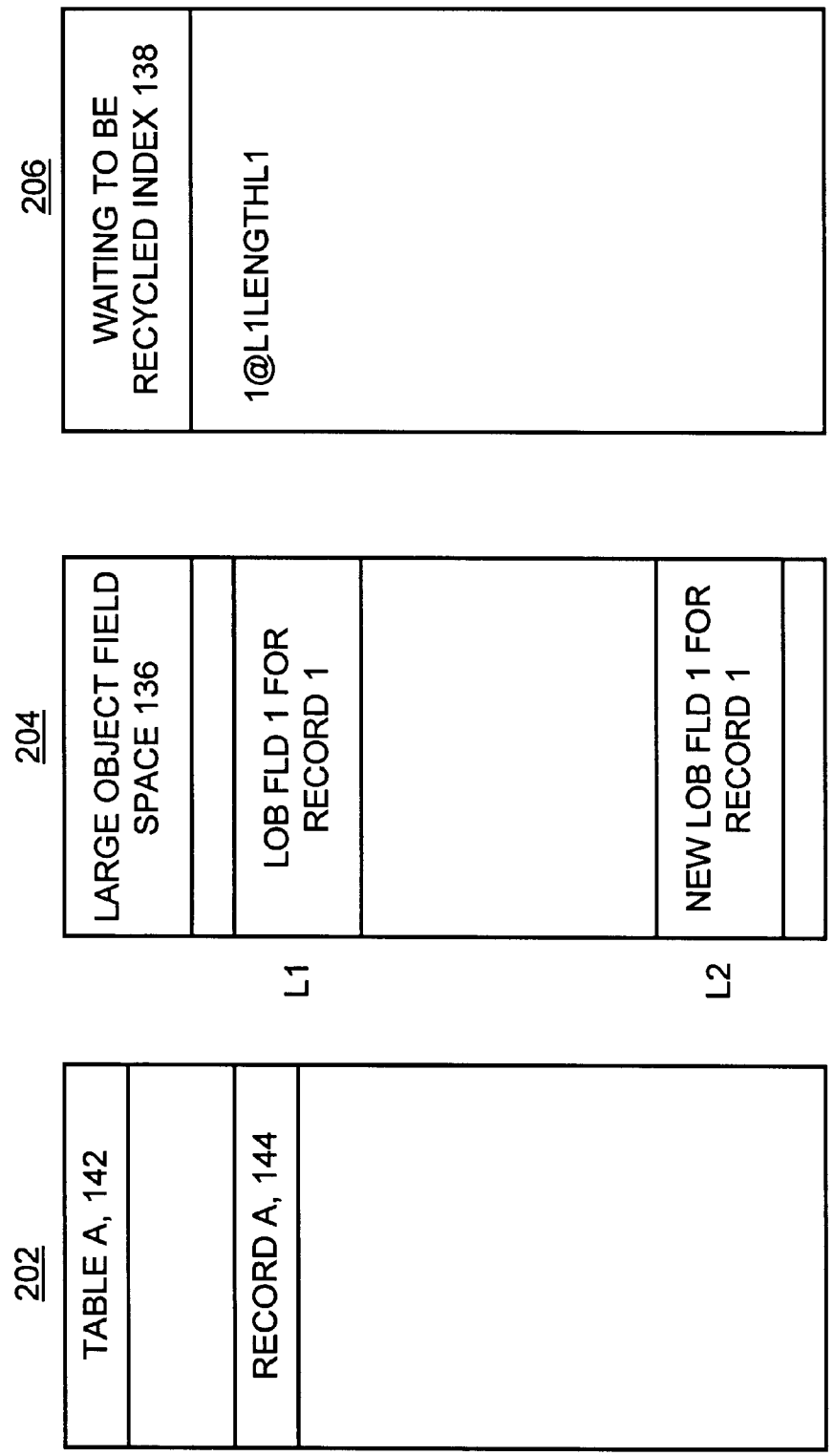
FIG. 2 is a logic flow diagram illustrating a lock based delayed space recycle control algorithm in accordance with the preferred embodiment.

Referring also to FIG. 2, there is shown a logical flow diagram generally designated by the reference character 200 of the preferred embodiment. At block 202, a table A, 142 is shown with a record A, 144. LOB pointers 146 L1, L2 are shown with a block 204. Block 204 includes a large object field space 136 with a LOB field 1 for record A or record 1, 144 and a new LOB field 1 for record 1, 144. A block 206 illustrates the waiting to be recycled index 138 including an entry or key 1@L1lenqthL1, including for each record #(aka rrn), an address of LOB space and a length of LOB space. In accordance with features of the invention, before update record A or record 1 points at LOB pointer L1, an update lock is obtained on record A, 144 and an update is performed. After update record A, 144 points at LOB pointer L2, LOB pointer L1 is waiting to be recycled.

To understand the operation of the lock based delayed space recycle program 132 and methods of the preferred embodiment, consider the following example sequence shown in TABLE 1:

TABLE 1

1) Read record 1 from table A.
2) Set locator 1, L2, to address LOB FLD 1 from record 1 from table A.
3) LocalCHAR128FLD1=Locator 1(1:128)/* Copy the first 128 bytes from lob FLD 1 record 1 via the locator*/.
4) Update Record A lob FLD 1.
5) Read record A from table A.
6) Set locator L2 to address LOB FLD 1 from record 1/* Get addressability to the post updated image of LOB FDL 1*/.
7) Commit/*Commit the change, freeing all active locators for this commit cycle, and release associated record locks*/.

As may be understood with reference to the exemplary program pseudo code of TABLE 1, the view of the large object field data seen through locator 1 on step 3 must be the same even after updating the large object field, as in step 4. After step 4 if step 3 is issued again it should yield the same results even though the data for LOB field 1 was changed on step 4. If the user wanted to see the updated image of LOB field 1 from record one they would need to reread the record and set a new locator to address the new image of LOB field 1 continuing with step 5 of TABLE 1.

After step 6, as long as locators 1 and 2 are active, they must see the same view of the data at the time the locator was set, even if the record gets updated many times. The scope of the Locators is defined to be within the commit cycle in step 7 of TABLE 1. That means all locators are implicitly freed at commit or rollback time. The commit or rollback not only frees the locators but also releases all record locks obtained within the cycle.

Features of and problems solved by the preferred embodiment are that the pre-update image of LOB 1 from record 1 addressed through locator 1 (step 2 locator 1 set to image of LOB FLD 1 returned from step 1) after that data is updated as we see in step 4. The preferred embodiment allocates new storage for the changed image of LOB FLD 1 in step 4, instead of overlaying the image, and keeps the pre-updated image by delaying the reuse of the storage area holding it. That storage area containing the old image is reused when it is known that Locator 1, or other locators within the current job or any other job, are no longer needed.

An important feature of the invention is knowing when those storage areas containing pre-updated LOB images can get recycled or reused for new and changed data inside of the table object 142. As updates to LOB data take place, new space is allocated while the current area for the LOB image does not get recycled. Keeping track of the space containing that area to be recycled internally is kept as part of the table object in the waiting to be recycled index 138. The key for an entry in that index has the ordinal number followed by length and address of the piece. To know when all old LOB images associated with a particular row from the table can be recycled, it is determined when the last lock is being released for that row. Then the table space used by those old LOB images is made available to be reused for newly inserted rows or for newly updated LOB fields. Old images in the waiting to be recycled index 138 are identified, for example, by using the record ordinal number as search criteria. In the example above, step 7 would cause the storage containing the pre-updated image of LOB FLD1 (the image returned in step 1) to be removed from the waiting to be recycled index and made available to be reused, only if there were no other record locks on Row 1 from table A. If there were other locks on record 1 from table A not being freed at step 7, the recycle of the storage containing the pre-update image of LOB FLD from record 1 would not be performed.

Figure 3:
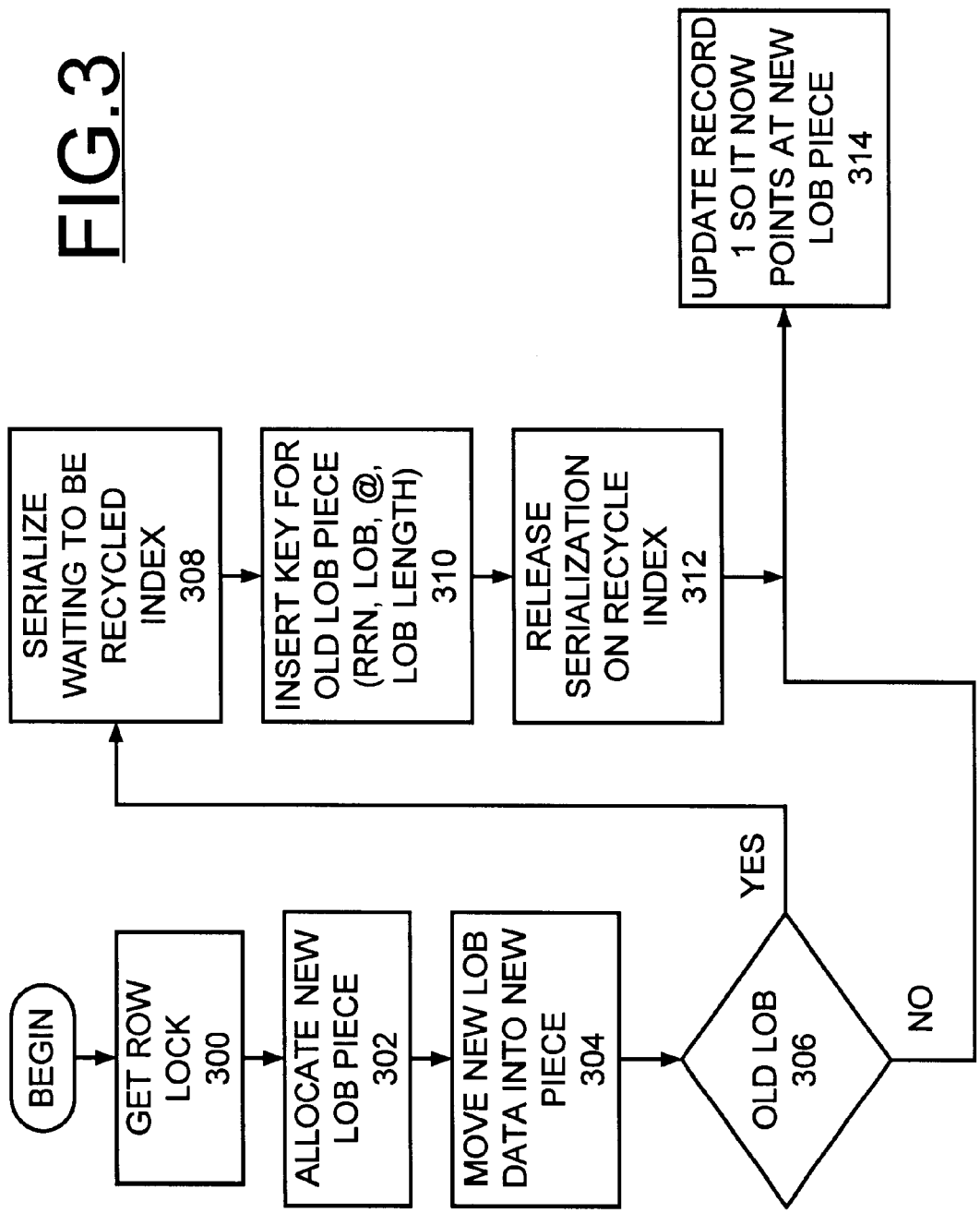
FIGS. 3 and 4 are flow diagrams illustrating methods for implementing lock based delayed space recycle control algorithm in accordance with the preferred embodiment.

Referring to FIG. 3 sequential operations of the lock based delayed space recycle method and computer program are shown for update of LOB record logic flow. Starting at block 300, a row lock is obtained. A new LOB piece is allocated as indicated in block 302. New LOB data is moved in the new LOB piece as indicated in block 304. Checking for an old LOB is performed as indicated in a decision block 306. When old LOB is identified, then it is serialized to the waiting to be recycled index as indicated in block 308. A key for the old LOB piece is inserted as indicated in block 310. The serialization on the recycle index is released as indicated in block 312. Next and when no old LOB is found at decision block 306, record 1 is updated to point at new LOB piece as indicated in block 314.

Figure 4:
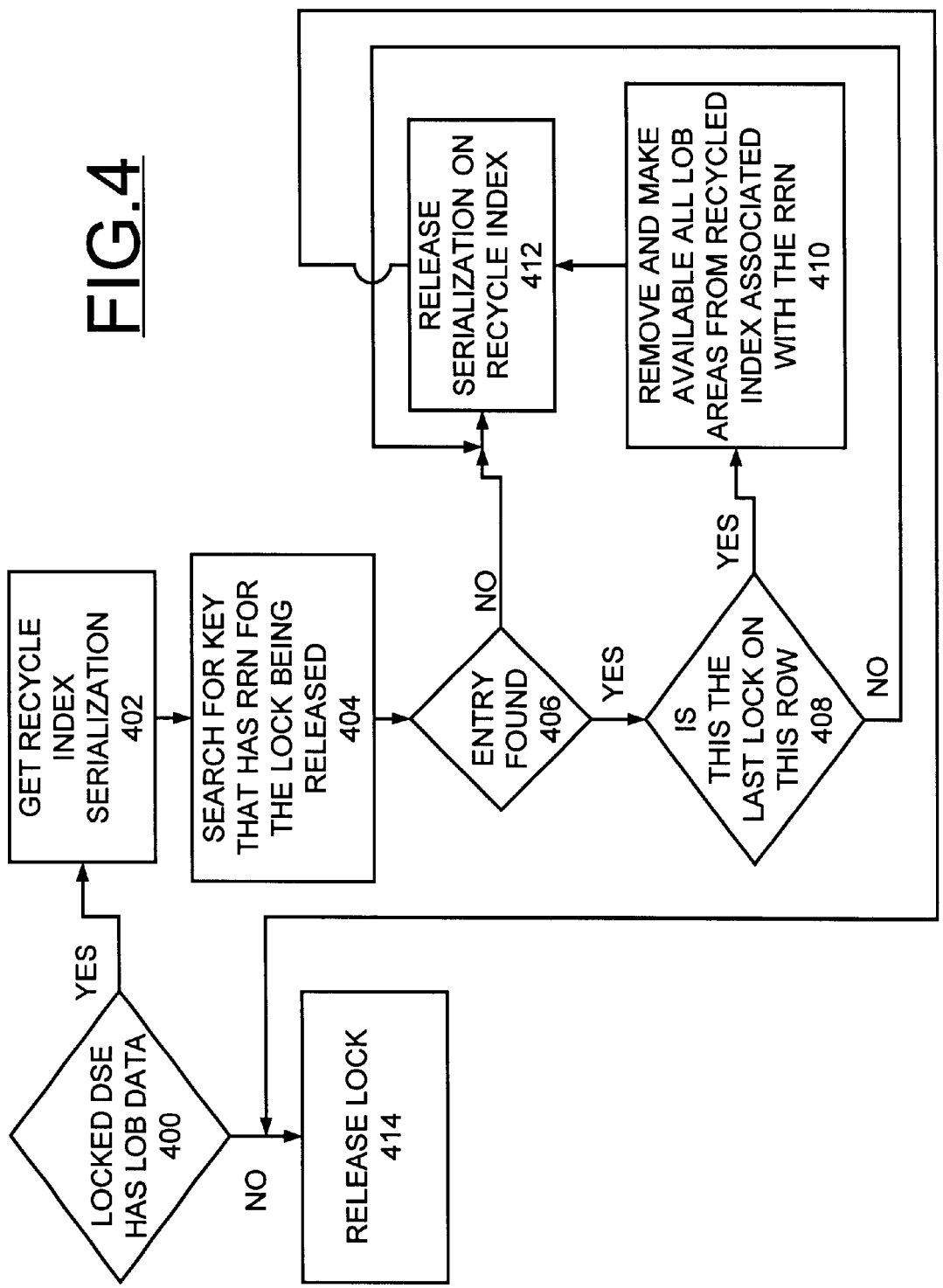

Referring to FIG. 4 sequential operations of the lock based delayed space recycle method and computer program are shown for release lock logic flow. Starting at decision block 400, checking for locked LOB data is performed. When locked LOB data is found, the recycle index serialization is obtained. Next searching for a key that has a record number for the lock being released is performed as indicated in block 404. When an entry is not found as indicated in a decision block 406, then checking whether this is the last lock on this row is performed as indicated in a decision block 408. When true, then all LOB areas are remove and made available from the recycled index associated with the record number as indicated in block 410. When an entry is not found as indicated in a decision block 406, then the serialization on the recycle index is released as indicated in block 412.

In brief summary of features of the invention, a pre-update view of data is provided by not updating data in place. For applications that update the same row multiple times, views of that data are provided at different points in time. When a record lock is freed, a check lock function of the resource management is used to find out if there are any locks other than the one to be released that is associated with this row. If not, then the old image areas within the table object can now be recycled to be used for future update or insert operations. The rules for the LOB locator state that they are all implicitly invalidated at DB Commit (as in step 7 above) or Rollback time. If there are other locks on the row we must delay recycling the old record images until that last lock is released. The methods of the present invention do not require the SQL code that frees a particular locator to know about all other locators in the system to be able to clean up the LOB copies or shadow pages. Also, multiple locators to the same data at a point in time can share the same image, thus eliminating the duplicate copies.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing lock based delayed space recycle of the preferred embodiment in the system 100 of FIGS. 1A and 1B.

A sequence of program instructions or a logical assembly of one or more interrelated modules defined by the recorded program means 504, 506, 508, 510, direct the computer system 100 for implementing lock based delayed space recycle of the preferred embodiment.

While the present invention has been described with reference to the details of the embodiments of the invention shown in the drawing, these details are not intended to limit the scope of the invention as claimed in the appended claims.

What is claimed is:

1. A memory space recycle method used with a memory in a computer system comprising the steps of:

obtaining a data element lock for a data record in a large object block;

performing an update on said data record; and maintaining a waiting to be recycled index for said large object block;

utilizing a record number, an address space and a length of said address space.

2. A memory space recycle method as recited in claim 1 includes the step of identifying a locked data element having no data and releasing said locked data element.

3. A memory space recycle method as recited in claim 1 includes the step of releasing said locked data element.

4. A memory space recycle method as recited in claim 3 includes the step of searching said waiting to be recycled index using a record number.

5. A memory space recycle method as recited in claim 4 includes the step of responsive to finding a matching entry, checking for a last lock on said data block element.

6. A memory space recycle method as recited in claim 5 includes the step of responsive to finding a last lock on said data block element, making available all data areas associated with said record number.

7. A memory space recycle method as recited in claim 6 includes the step of releasing serialization on said waiting to be recycle index.

8. A computer program product for implementing locked based delayed memory space recycle control for a computer, said program product including instructions stored on a recording medium to cause said computer to perform the steps of:

obtaining a data element lock for a data record in a large object block;

performing an update on said data record; and maintaining a waiting to be recycled index for said large object block using a record number, a data address and a data length for said data address.

9. A memory system in a computer comprising:

a shared memory;

a data manager associated with said shared memory; and a lock based delayed space recycle computer program for controlling memory space recycling in said shared memory; said lock based delayed space recycle computer program identifying a last lock on a locked memory element and releasing said locked memory element;

said lock based delayed space recycle computer program maintaining a waiting to be recycled index for a large object block utilizing a record number, a data address and a length for said address.

* * * * *